United States Patent
Tsukahara et al.

(10) Patent No.: US 8,395,830 B2
(45) Date of Patent: Mar. 12, 2013

(54) IMAGE READING SIGNAL PROCESSING IC, IMAGE READING APPARATUS, AND IMAGE FORMING APPARATUS

(75) Inventors: Hajime Tsukahara, Kanagawa (JP); Tohru Kanno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1271 days.

(21) Appl. No.: 11/776,132

(22) Filed: Jul. 11, 2007

(65) Prior Publication Data

US 2008/0024842 A1     Jan. 31, 2008

(30) Foreign Application Priority Data

Jul. 29, 2006   (JP) ................................. 2006-207274

(51) Int. Cl.
    *H04N 1/46* (2006.01)
(52) U.S. Cl. ........ 358/514; 358/504; 358/515; 358/518; 358/520; 358/530; 358/516; 382/165; 382/167; 348/231.99; 348/222.01; 348/241
(58) Field of Classification Search .................. 358/504, 358/515, 514, 518, 520, 530, 516; 382/165, 382/167; 348/231.99, 222.01, 241
    See application file for complete search history.

(56) References Cited

U.S. PATENT DOCUMENTS

| | | | | |
|---|---|---|---|---|
| 5,177,621 | A | * | 1/1993 | Ohtaki et al. ................. 358/406 |
| 5,347,372 | A | * | 9/1994 | Takahashi et al. ............ 358/471 |
| 5,408,113 | A | * | 4/1995 | Kanno et al. .................. 257/292 |
| 5,748,328 | A | * | 5/1998 | Usami et al. ................... 358/1.9 |
| 6,198,349 | B1 | * | 3/2001 | Kanno et al. .................. 330/282 |
| 6,426,804 | B1 | * | 7/2002 | Kanno et al. .................. 358/445 |
| 7,012,956 | B1 | * | 3/2006 | Thomsen et al. ............. 375/224 |
| 2004/0047007 | A1 | * | 3/2004 | Kanno .......................... 358/474 |
| 2004/0174567 | A1 | * | 9/2004 | Abe et al. ....................... 358/2.1 |
| 2005/0185721 | A1 | * | 8/2005 | Takeuchi ...................... 375/257 |

FOREIGN PATENT DOCUMENTS

| | | |
|---|---|---|
| JP | 10-276368 | 10/1998 |
| JP | 11-164140 | 6/1999 |
| JP | 2000-122188 | 4/2000 |
| JP | 3262609 | 12/2001 |
| JP | 2003-274092 | 9/2003 |
| JP | 2003-294812 | 10/2003 |
| JP | 2005-86748 | 3/2005 |
| JP | 2005-225134 | 8/2005 |

OTHER PUBLICATIONS

U.S. Appl. No. 12/099,508, filed Apr. 8, 2008, Nakazawa, et al.
U.S. Appl. No. 12/113,509, filed May 1, 2008, Tsukahara.
U.S. Appl. No. 12/119,941, filed May 13, 2008, Nagase, et al.

* cited by examiner

*Primary Examiner* — David K Moore
*Assistant Examiner* — Pawandeep Dhingra
(74) *Attorney, Agent, or Firm* — Oblon, Spivak, McClelland, Maier & Neustadt, L.L.P.

(57) ABSTRACT

An image reading signal processing IC includes three circuits which independently process input analog image signals of three primary colors. Each circuit includes an ADC which converts amplified analog image signals into digital image data. Each circuit also includes an LVDS processing circuit which outputs the digital image data in a low voltage differential signaling level. Each circuit further includes a test pattern generating circuit connected between the ADC and the LVDS processing circuit for generating digital data of a test pattern. The image reading signal processing IC additionally includes an operational mode determination information input unit which inputs operational mode determination information to the test pattern generating circuit. Further, the image reading signal processing IC includes a switching unit which switches one of the digital data of the test patterns to any one or more of main scanning direction gradation pattern data and sub scanning direction gradation pattern data.

11 Claims, 14 Drawing Sheets

IMAGE READING SIGNAL PROCESSING IC, IMAGE READING APPARATUS, AND IMAGE FORMING APPARATUS

BACKGROUND OF THE INVENTION

1. Field of the Invention

The present invention generally relates to an image reading signal processing IC to which analog image signals are input, where the analog image signals are formed by optically reading color image information of a document and converting the read color image information into electric signals corresponding to three primary colors, and from which digital image data are output in a LVDS (low voltage differential signaling) level by amplifying the analog image signals and converting the amplified analog signals into the digital image data; an image reading apparatus using the image reading signal processing IC such as an image scanner, and an image forming apparatus using the image reading apparatus as an image reading section such as a digital copying apparatus, a facsimile apparatus, and a multifunctional apparatus having functions of the digital copying apparatus and the facsimile apparatus.

2. Description of the Related Art

In Patent Document 1, an image reading apparatus is disclosed. An image reading section in the image reading apparatus provides a scanning optical system, a CCD (charge coupled device) which is a line sensor, an image reading signal processing circuit, a shading correction circuit, and so on. The scanning optical system forms a reduced image by optically scanning a document. The CCD sequentially converts image information of the reduced image into an electric signal line by line. The image reading signal processing circuit amplifies analog image signals (electric signals) output from the CCD and converts the amplified analog signals into digital image data. The shading correction circuit corrects a light amount distribution of a light source in the scanning optical system and dispersion of sensitivity of pixels in one line of the CCD.

In addition, in Patent Document 2, an image reading apparatus is disclosed. In the image reading apparatus, a color image sensor is used. The color image sensor converts image information separated into three primary colors of R (red), G (green), and B (blue) into corresponding electric signals, the electric signals are amplified, and the amplified electric signals are converted into digital signals.

In addition, in Patent Document 3, an image reading apparatus is disclosed. The image reading apparatus provides a test pattern signal generating unit and selects a color image which is read and a test pattern. The color image and the test pattern are converted into digital signals.

[Patent Document 1] Japanese Patent No. 3262609 (Japanese Laid-Open Patent Application No. 6-189132)

[Patent Document 2] Japanese Laid-Open Patent Application No. 2000-122188

[Patent Document 3] Japanese Laid-Open Patent Application No. 2003-274092

FIG. 18 is a block diagram showing an image reading signal processing IC 100 in an image reading apparatus. In FIG. 18, in addition to the image reading signal processing IC 100, a CCD 6 and capacitors Cr, Cg, and Cb are shown.

The CCD 6 is a color linear image sensor which reads image information of a document and outputs analog image signals of RO, GO, and BO of three primary colors of the image information of the document. Then the analog image signals of RO, GO, and BO are input to the image reading signal processing IC 100 via the corresponding capacitors Cr, Cg, and Cb.

The image reading signal processing IC 100 independently provides three circuits for corresponding three input signals RIN, GIN, and BIN. That is, the image reading signal processing IC 100 provides a clamp circuit 12R which regulates input terminal potential for the input signal RIN after AC coupling by the capacitor Cr, an SH (sample-hold) circuit 13R which extracts only an image reading signal component from the input signal RIN, a VGA (variable gain amplifier) 14R which amplifies the image reading signal component extracted from the SH circuit 13R by a predetermined amplification factor, an ADC (analog to digital converter) 15R which converts the amplified analog signal into digital image data DRO, and an LVDS (low voltage differential signaling) processing circuit 17R which outputs the DRO at a low voltage differential signaling level. In addition, the image reading signal processing IC 100 provides a clamp circuit 12G which regulates input terminal potential for the input signal GIN after AC coupling by the capacitor Cg, an SH circuit 13G which extracts only an image reading signal component from the input signal GIN, a VGA 14G which amplifies the image reading signal component extracted from the SH circuit 13G by a predetermined amplification factor, an ADC 15G which converts the amplified analog signal into digital image data DGO, and an LVDS processing circuit 17G which outputs the DGO at a low voltage differential signaling level. Further, the image reading signal processing IC 100 provides a clamp circuit 12B which regulates input terminal potential for the input signal BIN after AC coupling by the capacitor Cb, an SH circuit 13B which extracts only an image reading signal component from the input signal BIN, a VGA 14B which amplifies the image reading signal component extracted from the SH circuit 13B by a predetermined amplification factor, an ADC 15B which converts the amplified analog signal into digital image data DBO, and an LVDS processing circuit 17B which outputs the DBO at a low voltage differential signaling level.

The LVDS processing circuits 17R, 17G, and 17B convert the corresponding parallel digital image data DRO, DGO, and DBO into serial data and further convert the serial data into low voltage (low amplitude) differential signals LVR+/LVR−, LVG+/LVG−, and LVB+/LVB− and output the low voltage differential signals to an image processing printed circuit board (not shown).

The image reading signal processing IC 100 further provides a TG & I/F (timing generator and interface) 101 for matching the operational timings of the three circuits for the input signals RIN, GIN, and BIN, an LVDS processing circuit 17K, and a PLL (phase locked loop) circuit 19.

A signal CLMPIN which is input to the TG & I/F 101 becomes a gate signal CLMP for controlling the clamp circuits 12R, 12G, and 12B. A signal SH which is input to the TG & I/F 101 becomes a sample clock SH which makes the SH circuits 13R, 13G, and 13B sample a signal region of the image signal. A signal MCLK which is input to the TG & I/F 101 is a reference clock MCLK for controlling the ADCs 15R, 15G, and 15B. The signals CLMPIN, SH, and MCLK are input to the TG & I/F 101 from a timing generating ASIC (application specific integrated circuit) (not shown) used exclusively for the signals. Signals SCLK, SD, and CS are input to the TG & I/F 101 from a CPU in the image processing printed circuit board (not shown). The signals SCLK, SD, and CS are described below.

Each of the VGAs 14R, 14G, and 14B provides a register which stores a gain value via a data address bus which value is determined by a CPU (not shown) disposed at a subsequent stage.

The reference clock MCLK becomes a clock LVCK by being multiplied by "n" at the PLL circuit 19 and the clock LVCK is input to the LVDS processing circuits 17R, 17G, 17B, and 17K. The clock LVCK is used to convert the parallel data into serial data at the LVDS processing circuits 17R, 17G, and 17B. The "n" is the number of bits of the parallel data to be input to the LVDS processing circuits 17R, 17G, and 17B so that the parallel data can be converted into the serial data. The LVDS processing circuit 17K does not execute the conversion of the parallel data into the serial data, but outputs the clock LVCK as the low voltage differential signal LVCK+/LVCK− to the image processing printed circuit board.

The image data output from the image reading signal processing IC 100 are input to the image processing printed circuit board. In order to obtain a reason for failure of a printed circuit board in the image reading apparatus and a reason for abnormal image output from the image reading apparatus in the market, each printed circuit board provides a function for outputting a predetermined test pattern.

In order to reduce the cost of the image reading apparatus, it is effective to reduce the number of components in the image reading apparatus. However, generally, the image processing printed circuit board is disposed in a scanner unit on which a CCD is mounted, and the image reading signal processing IC 100 or an LSI including the image reading signal processing IC 100 are disposed at a subsequent stage of the scanner unit. In order to obtain the reason for failure in the market, a test pattern generating circuit must be disposed at a subsequent stage of the image reading signal processing IC 100.

However, in the case shown in FIG. 18, an LSI is not disposed at the subsequent stage of the image reading signal processing IC 100. When the test pattern generating circuit is disposed as an external circuit, the number of components is increased, the size of the image reading apparatus is enlarged, and the cost is increased. When the test pattern generating circuit is not disposed, it takes a long time to obtain the reason for the failure.

In addition, in a case where the image reading signal processing IC 100 outputs signals of the LVDS level, when an LSI is disposed at the subsequent stage, the LVDS level must be converted into a TTL level or a CMOS level.

SUMMARY OF THE INVENTION

In a preferred embodiment of the present invention, there is provided an image reading signal processing IC, an image reading apparatus using the image reading signal processing IC, and an image forming apparatus using the image reading signal processing IC in which a test pattern generating function is performed within the IC. With this, the cost of the image reading apparatus is reduced and the area for mounting a test pattern generating circuit is not required in a printed circuit board disposed at the subsequent stage.

In addition, at an inspection process of the image reading signal processing IC, an internal circuit can be inspected by using the test pattern. Then a failure of the image reading signal processing IC can be easily detected by using the test pattern, and the inspection cost can be reduced.

Features and advantages of the present invention are set forth in the description that follows, and in part will become apparent from the description and the accompanying drawings, or may be learned by practice of the invention according to the teachings provided in the description. Features and advantages of the present invention will be realized and attained by an image reading signal processing IC, an image reading apparatus using the image reading signal processing IC, and an image forming apparatus using the image reading signal processing IC particularly pointed out in the specification in such full, clear, concise, and exact terms so as to enable a person having ordinary skill in the art to practice the invention.

To achieve one or more of these and other advantages, according to one aspect of the present invention, there is provided an image reading signal processing IC to which analog image signals are input, where the analog image signals are formed by optically reading color image information of a document and converting the read color image information into electric signals corresponding to three primary colors. The image reading signal processing IC includes three circuits which independently process the input analog image signals of the corresponding three primary colors. Each of the three circuits includes a sample-hold circuit which samples the analog image signals and holds the values of the sampled analog image signals, a VGA (variable gain amplifier) which amplifies the analog image signals held by and output from the sample-hold circuit, an ADC (analog to digital converter) which converts the amplified analog image signals into digital image data, an LVDS (low voltage differential signaling) processing circuit which outputs the digital image data in a low voltage differential signaling level, and a test pattern generating circuit connected between the ADC and the LVDS processing circuit for generating digital data of a test pattern. The image reading signal processing IC further includes an operational mode determination information input unit which inputs operational mode determination information to the test pattern generating circuit. An operational mode of each of the test pattern generating circuits is switched between a normal mode which outputs digital image data output from the ADC and a test pattern output mode which outputs the digital data of the test pattern generated by the test pattern generating circuit corresponding to the operational mode determination information input from the operational mode determination information input unit.

EFFECT OF THE INVENTION

According to an embodiment of the present invention, since an image reading signal processing IC includes a test pattern generating function, it is not necessary to provide a test pattern generating circuit in a subsequent stage of the image reading signal processing IC. Therefore, the cost of an image reading apparatus including the image reading signal processing IC is decreased and an area to mount the pattern generating circuit is not required in the image reading apparatus. In addition, in an inspection process of the image reading signal processing IC, an internal circuit can be inspected by using the test pattern generated inside. Therefore, failure detection efficiency in the image reading signal processing IC can be increased and inspection cost can be decreased.

BRIEF DESCRIPTION OF THE DRAWINGS

Features and advantages of the present invention will become more apparent from the following detailed description when read in conjunction with the accompanying drawings, in which.

DESCRIPTION OF THE PREFERRED EMBODIMENTS

[Best Mode of Carrying Out the Invention]

The best mode of carrying out the present invention is described with reference to the accompanying drawings.

[Scanning Optical System]

Figure 2:
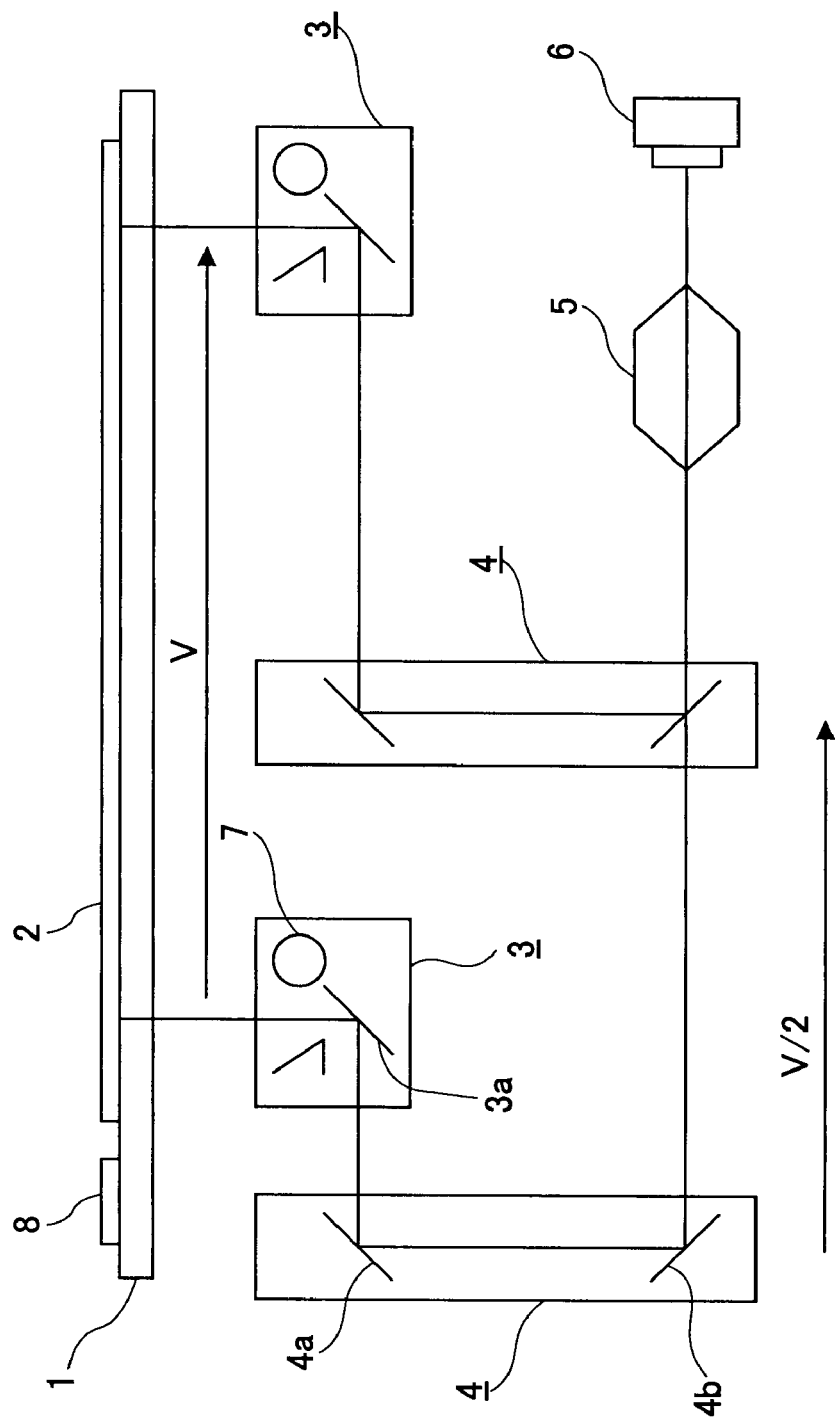
FIG. 2 is a schematic diagram showing a scanning optical system using in an image reading apparatus according to embodiments of the present invention.

First, referring to FIG. 2, a scanning optical system which is common in embodiments of the present invention is described. FIG. 2 is a schematic diagram showing the scanning optical system using in an image reading apparatus according to the embodiments of the present invention.

In FIG. 2, a document 2 put on a contact glass 1 is illuminated by light from a lighting optical system having a light source 7. Light reflected from the document 2 is deflected and reflected by a first mirror 3a in a first moving member 3 and the deflected and reflected light by the first moving member 3 is sequentially deflected and reflected by a first mirror 4a and a second mirror 4b in a second moving member 4. The light deflected and reflected by the second moving member 4 is led to a condenser lens 5 and a reduced image of the document 2 is formed on a surface of a CCD 6 (color linear image sensor) by the condenser lens 5.

The CCD 6 includes three light receiving sections (photoelectric conversion sections) having color filters each of which transmits only the corresponding one of a red component, a green component, and a blue component of an image to be formed on the surface of the CCD 6, and outputs analog image signals corresponding to red, green, and blue of the three primary colors from the light receiving sections.

When the document 2 is read, the first moving member 3 moves to a position shown by 3' at a velocity of V along a long-length direction of the document 2 and the second moving member 4 moves to a position shown by 4' at a velocity of V/2 together with the first moving member 3. With this, information of the document 2 in the long-length direction is read.

A reference white plate 8 is disposed at the left end position on the contact glass 1. The reference white plate 8 is used for shading data generation and automatic gain adjustment and is a reference of a white level in the image reading apparatus using the scanning optical system. An output level from the image reading apparatus is predetermined in a case where the reference white plate 8 is read. The output level is called a white level target value.

A VGA (described below) adjusts the gain so that the read level of the reference white plate 8 becomes the white level target value, because the dynamic range of an ADC (described below) in an image reading signal processing IC (described below) is desired to be used as widely as possible.

[First Embodiment]

Figure 1:
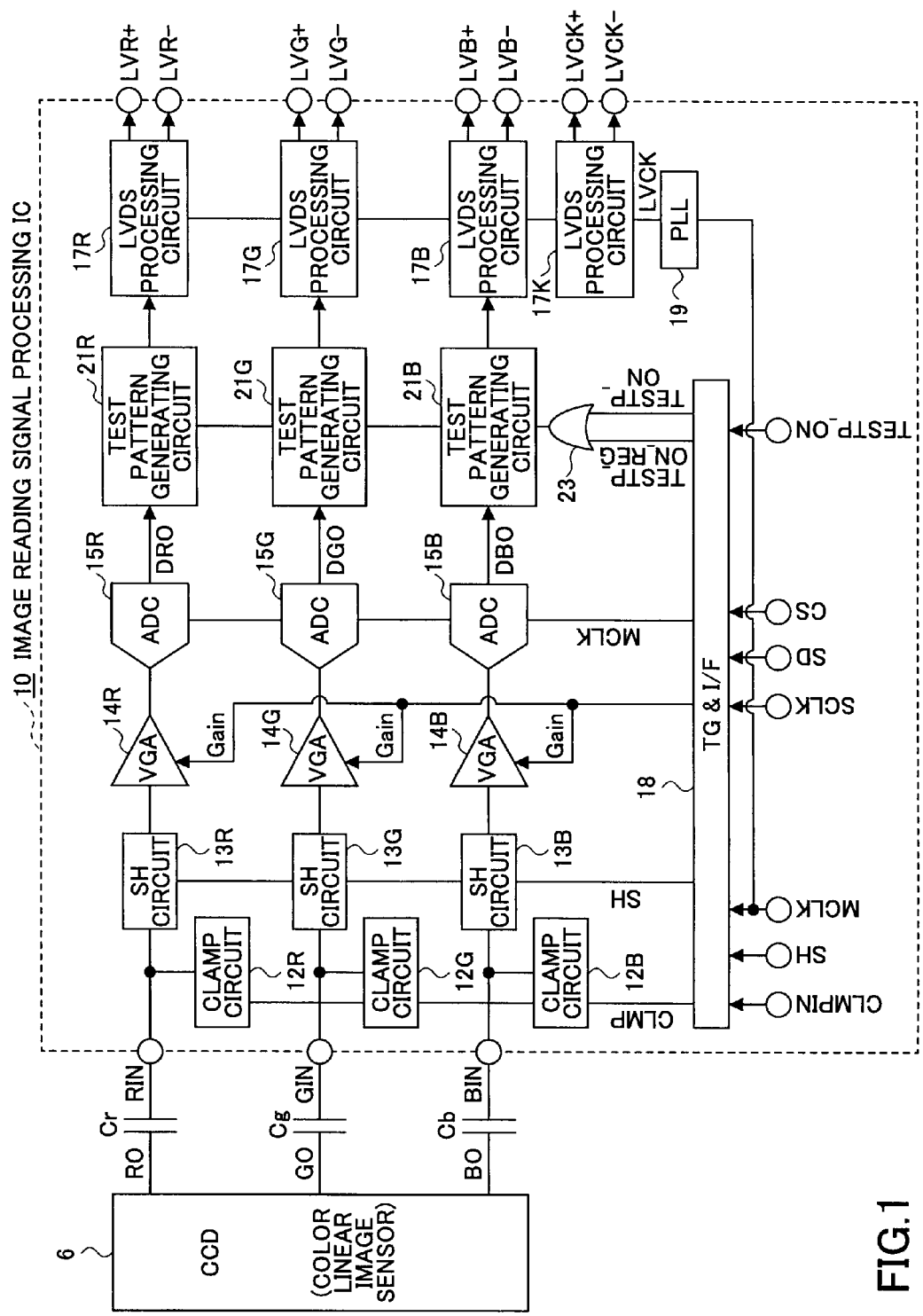
FIG. 1 is a block diagram showing an image reading signal processing IC according to a first embodiment of the present invention.
Figure 18:
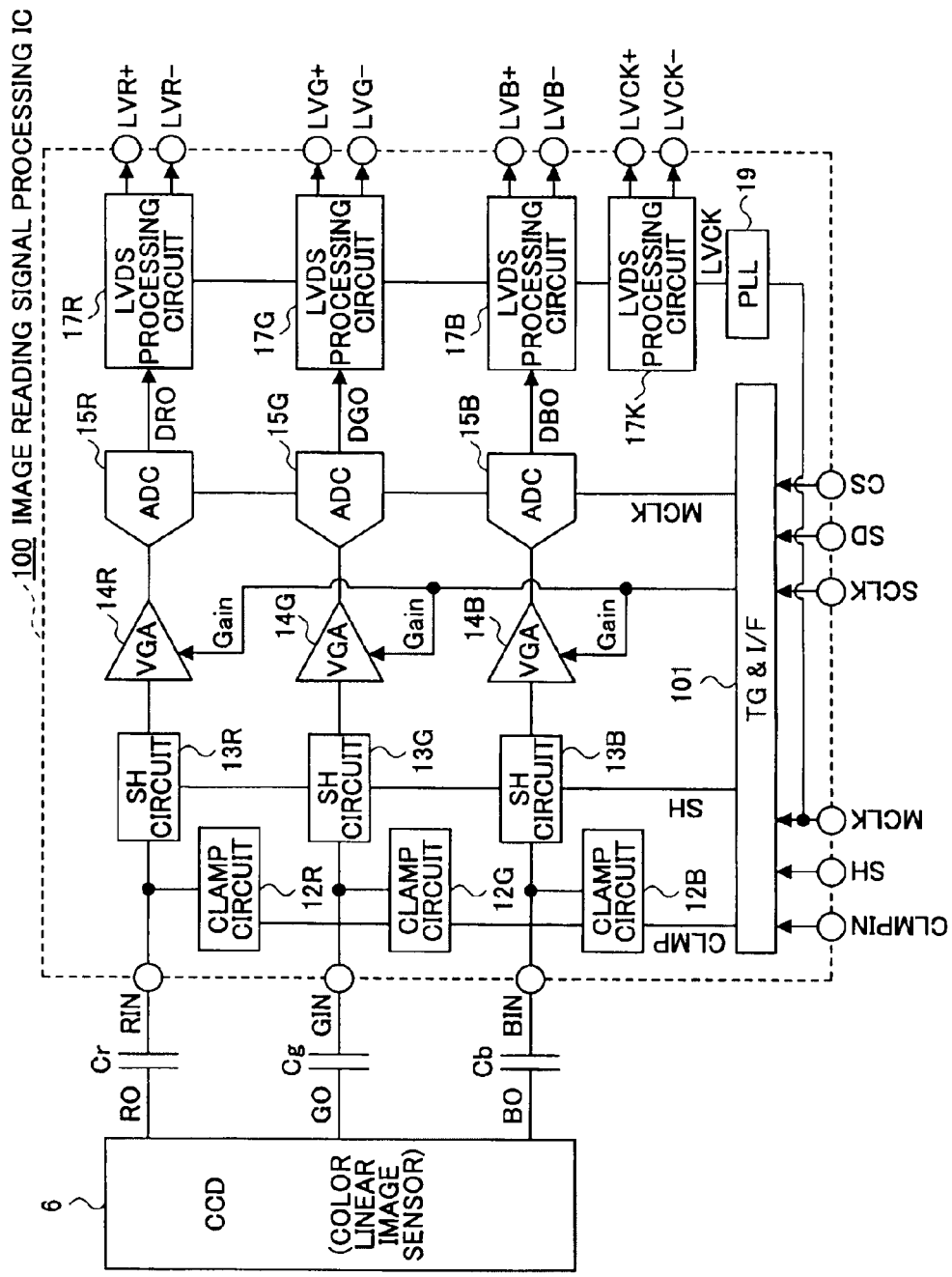
FIG. 18 is a block diagram showing an image reading signal processing IC in an image reading apparatus.

Referring to FIGS. 1 through 11, an image reading signal processing IC according to a first embodiment of the present invention is described. FIG. 1 is a block diagram showing an image reading signal processing IC 10 according to the first embodiment of the present invention. In FIG. 1, in addition to the image reading signal processing IC 10, the CCD 6 and the capacitors Cr, Cg, and Cb are shown. In the first embodiment of the present invention, the CCD 6 is a color linear image sensor which outputs analog image signals (image reading signals) RO, GO, and BO of three primary colors. The image reading signal processing IC 10 shown in FIG. 1 includes common elements with the image reading signal processing IC 100 shown in FIG. 18; therefore, each of the common elements has the same reference number as that shown in FIG. 18 and the description of the common elements is omitted.

As shown in FIG. 1, the image reading signal processing IC 10 additionally includes test pattern generating circuits 21R, 21G, and 21B. The test pattern generating circuits 21R, 21G, and 21B generate digital data of a test pattern for the corresponding digital image data DRO, DGO, and DBO, and are connected between the corresponding ADC 15R, 15G, and 15B, and the corresponding LVDS processing circuits 17R, 17G, and 17B. Further, the image reading signal processing IC 10 additionally includes an OR gate 23. The OR gate 23 inputs a control signal TESTP_ON or a register signal TESTP_ON_REG output from a TG & I/F 18 to corresponding control terminals of the test pattern generating circuits 21R, 21G, and 21B. In addition, as shown in FIG. 1, the structure of the TG & I/F 18 is different from that of the TG & I/F 101 shown in FIG. 18.

The control signal TESTP_ON input from an external device to the TG & I/F 18 is input to the corresponding control terminals of the test pattern generating circuits 21R, 21G, and 21B via the OR gate 23. When the control signal TESTP_ON is "H", the test pattern generating circuits 21R, 21G, and 21B enter a test pattern output mode and output digital data of a test pattern generated from the corresponding digital image data DRO, DGO, and DBO. When the control signal TESTP_ON is "L", the test pattern generating circuits 21R, 21G, and 21B enter a normal mode and output the corresponding digital image data DRO, DGO, and DBO input from the corresponding ADCs 15R, 15G, and 15B as they are.

In addition, signals SCLK, SD, and CS from a CPU (not shown) write values in a test pattern ON/OFF register of the TG & I/F 18. The signals SCLK, SD, and CS are sent from the CPU via a data address bus between the image reading signal processing IC 10 and the CPU by serial communication. With this, the TG & I/F 18 controls logic of the register signal TESTP_ON_REG.

The register signal TESTP_ON_REG is input to the corresponding control terminals of the test pattern generating circuits 21R, 21G, and 21B via the OR gate 23. When the register signal TESTP_ON_REG is "H", the test pattern generating circuits 21R, 21G, and 21B enter a test pattern output mode and generate "digital data of a test pattern based on the read image of the document" and output the digital data. When the register signal TESTP_ON_REG is "L", the test pattern generating circuits 21R, 21G, and 21B enter a normal mode and output the corresponding digital image data DRO, DGO, and DBO input from the corresponding ADCs 15R, 15G, and 15B.

The above "digital data of a test pattern based on the read image of the document" have the same output format as data read by the CCD 6 and the test pattern is a continuous pattern including analogous pattern change.

An operational mode determination information input unit is formed of the input terminal of the TG & I/F 18 where the control signal TESTP_ON is input from the external device, the test pattern ON/OFF register in the TG & I/F 18, and the OR gate 23. The operational mode determination information input unit inputs operational mode determination information to each of the test pattern generating circuits 21R, 21G, and 21B. As described above, the OR gate 23 gives the control signal TESTP_ON or the register signal TESTP_ON_REG from the TG & I/F 18 to each control terminal of the test pattern generating circuits 21R, 21G, and 21B.

That is, corresponding to the operational mode determination information input from the operational mode determination information unit, that is, corresponding to any one of the control signal TESTP_ON and the register signal TESTP_ON_REG being "H" or both the control signal TESTP_ON and the register signal TESTP_ON_REG being "L", the operational mode of each of the test pattern generating circuits 21R, 21G, and 21B is set to the test pattern output mode or the normal mode, respectively. As described above, in the normal mode, the digital image data DRO, DGO, and DBO input from the ADCs 15R, 15G, and 15B are output as they are, and in the test pattern output mode, the generated digital data of the test pattern are output.

As described above, since the image reading signal processing IC 10 includes a test pattern generating function, it is not necessary to provide a test pattern generating circuit in the subsequent stage. Therefore, the cost of the image reading apparatus is decreased and an area to mount the pattern generating circuit is not required in the image processing printed circuit board disposed at the subsequent stage. In addition, in an inspection process of the image reading signal processing IC 10, an internal circuit can be inspected by using the image data of the test pattern generated inside the image reading signal processing IC 10. Therefore, failure detection efficiency in the image reading signal processing IC 10 can be increased and inspection cost can be decreased.

In the specification, when a suffix is not attached to a reference number of an element, the element represents the set of elements. For example, the test pattern generating circuit 21 represents the test pattern generating circuits 21R, 21G, and 21B.

Figure 3:
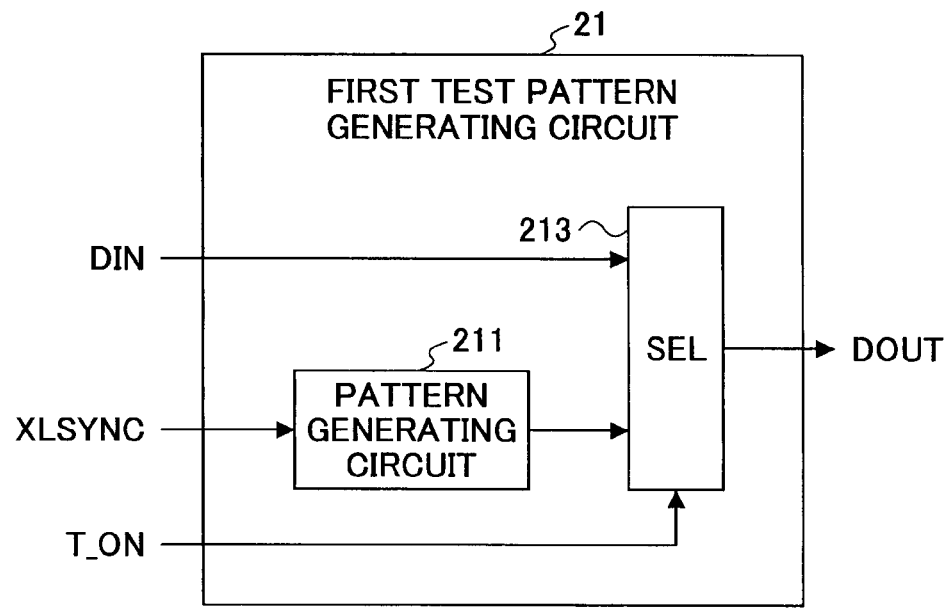
FIG. 3 is a block diagram showing a first test pattern generating circuit according to the embodiments of the present invention.

Next, referring to FIG. 3, the structure and operations of each of the test pattern generating circuits 21R, 21G, and 21B is described. FIG. 3 is a block diagram showing a first test pattern generating circuit 21. The first test pattern generating circuit 21 can be used as any of the test pattern generating circuits 21R, 21G, and 21B.

As shown in FIG. 3, the first test pattern generating circuit 21 includes a pattern generating circuit 211 and a selector (SEL) 213. Digital image data DIN which are one of the digital image data DRO, DGO, and DBO input from the corresponding ADCs 15R, 15g, and 15B are input to one input terminal of the SEL 213.

The pattern generating circuit 211 generates digital data of a test pattern synchronized with a line synchronization signal XLSYNC of an image reading apparatus using the image reading signal processing IC 10 and inputs the generated digital data of the test pattern to the other input terminal of the SEL 213.

In FIG. 3, a signal T_ON is the operational mode determination information which is an OR signal of the control signal TESTP_ON and the register signal TESTP_ON_REG output from the OR gate 23.

When the signal T_ON is "H", the SEL 213 outputs the test pattern data input from the pattern generating circuit 211, and when the signal T_ON is "L", the SEL 213 outputs the digital image data DIN.

Figure 4:
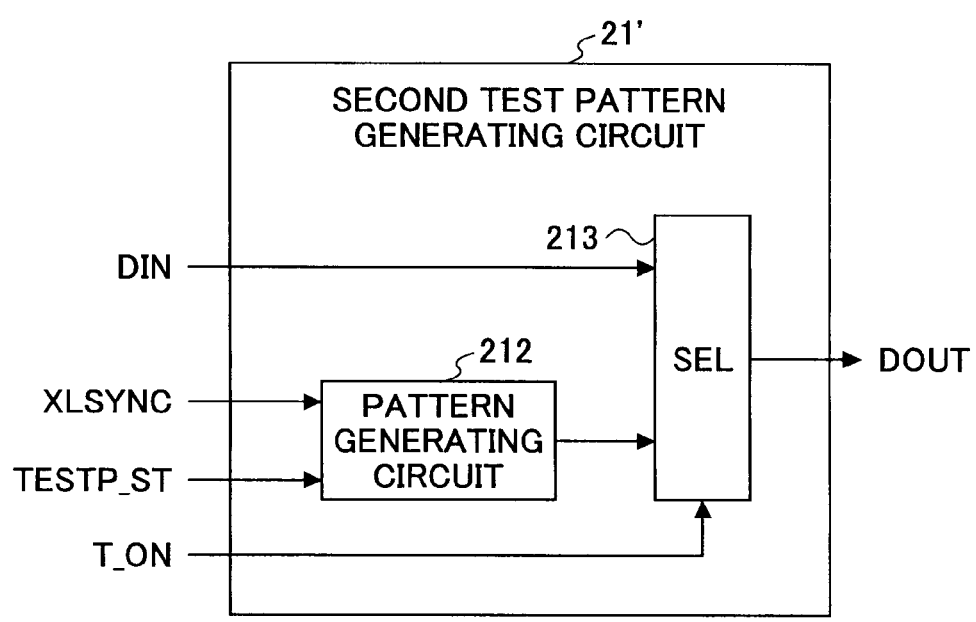
FIG. 4 is a block diagram showing a second test pattern generating circuit according to the embodiments of the present invention.

FIG. 4 is a block diagram showing a second test pattern generating circuit 21' according to the first embodiment of the present invention. The second test pattern generating circuit 21' can be used as any of the test pattern generating circuits 21R, 21G, and 21B.

The structure of the second test pattern generating circuit 21' shown in FIG. 4 is almost equal to the structure of the first test pattern generating circuit 21 shown in FIG. 3. However, the second test pattern generating circuit 21' includes a pattern generating circuit 212 instead of including the pattern generating circuit 211 shown in FIG. 3. Further, in addition to the input of the line synchronization signal XLSYNC, a test pattern signal TESTP_ST is input to the second test pattern generating circuit 21'.

When the test pattern signal TESTP_ST is "L", the pattern generating circuit 212 generates digital data of a test pattern synchronized with the line synchronization signal XLSYNC and outputs the generated digital data of the test pattern (test pattern data), and when the test pattern signal TESTP_ST is "H", the pattern generating circuit 212 outputs predetermined digital data (OLSB fixed data). The test pattern signal TESTP_ST can be input from an external device similar to the signal T_ON or can be generated by setting a register.

Figure 5:
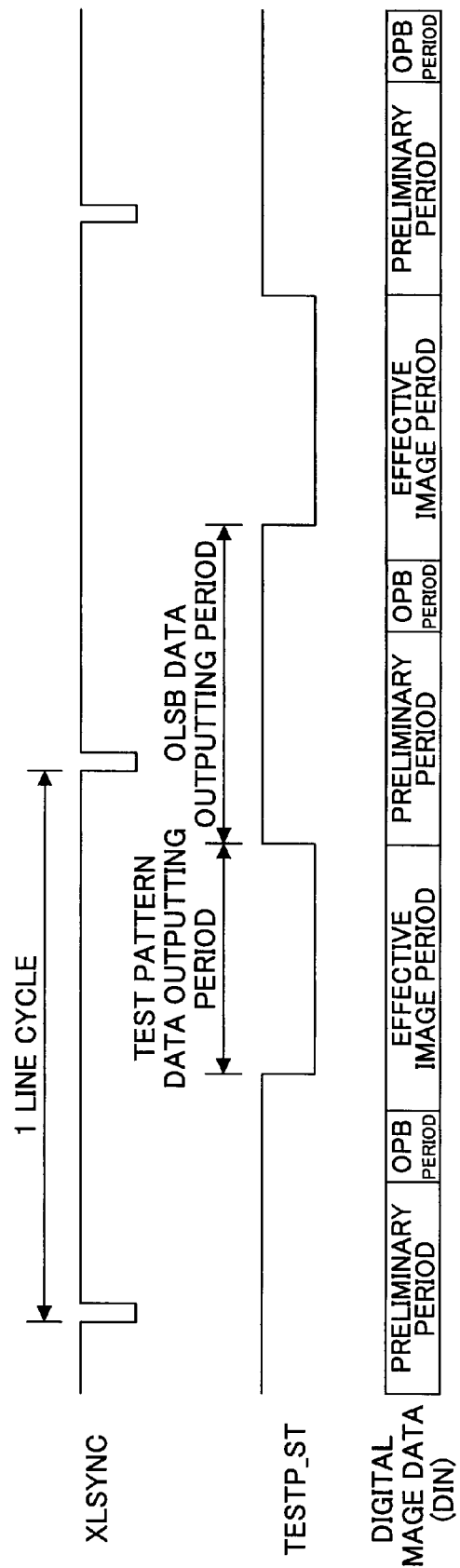
FIG. 5 is a timing chart showing a relationship among a line synchronization signal, a test pattern signal, and digital image data shown in FIG. 4.

FIG. 5 is a timing chart showing a relationship among the line synchronization signal XLSYNC, the test pattern signal TESTP_ST, and the digital image data DIN (DRO, DGO, and DBO). As shown in FIG. 5, a test pattern data outputting period and an OLSB fixed data outputting period (whose minimum signal unit is 0) exist in one line cycle. In the digital image data DIN generated from signals of the CCD 6, there are a preliminary period, an OPB (optical black) period, and an effective image period. The OPB period is an output level period when light is not input to the CCD 6.

The test pattern data outputting period begins after passing a short period from starting the effective image period and stops at the end of the effective image period.

In an image reading apparatus, in order to remove influences caused by dispersion of a light amount distribution of a light source and dispersion of sensitivity of pixels in a CCD, a shading correction is generally executed. In the shading correction, an operation for removing a black level offset is included (in some cases, the operation for removing the black level offset is executed in a correction other than the shading correction).

Image data of one line by a general-purpose CCD include black level pixels before an effective image. In general image processing, the black level pixels in a period including the black level pixels are averaged and a black level to be subtracted is determined.

When the digital data of the test pattern (test pattern data) are output, since processes in the image processing printed circuit board at the subsequent stage are the same as those when the test pattern data are not output, in the test pattern data, an output in the black level pixel period of the CCD is determined as the OLSB fixed data. With this, the black level to be subtracted is determined as the OLSB fixed data.

Even if the black level subtraction for removing the black level offset is executed as described above, the level of the test pattern data is not changed.

In addition, since a first pixel number in the CCD pixel numbers is not equal in plural image reading apparatuses, when the test pattern data outputting period can be designated in one line cycle, the image reading signal processing IC 10 can be applied to each of the plural image reading apparatuses.

The shading correction operation in the image reading apparatus is executed in the following.

$$Dout=\{(Din-\text{black level})/(Dsh-\text{black level})\}\times(2^n-1)$$

where Dout is output image data after the shading correction, Din (DIN) is digital image data of a document, Dsh is reference white plate image data, and "n" is the number of bits in the ADC.

In the image processing, the above operation result is output as the output image data.

When Dsh=$2^n-1$ and the black level=0, Din=Dout. That is, Din (DIN) in the first and second test pattern generating circuits 21 and 21' is output to the circuit at the subsequent stage as it is.

Figure 6:
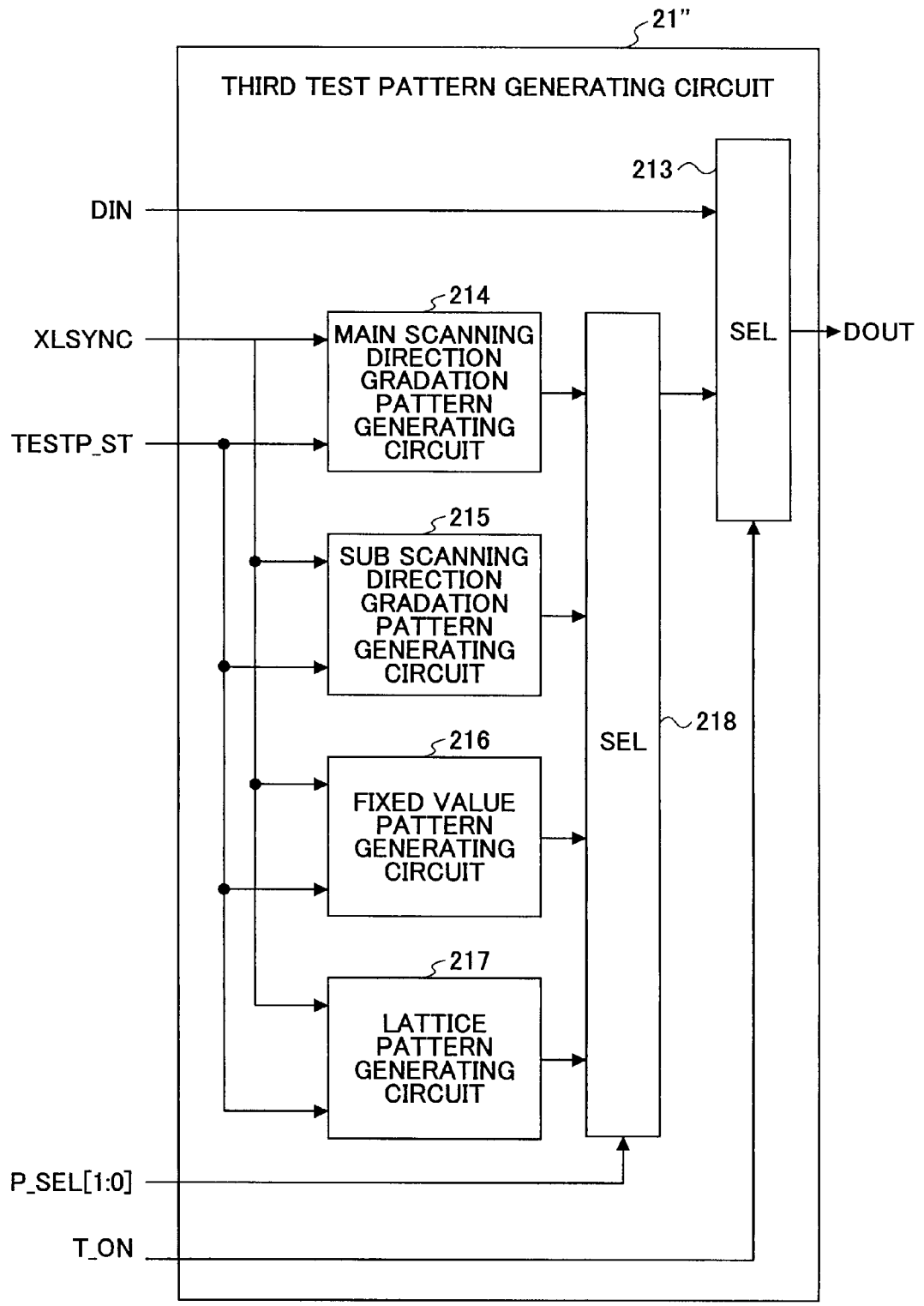
FIG. 6 is a block diagram showing a third test pattern generating circuit according to the embodiments of the present invention.

FIG. 6 is a block diagram showing a third test pattern generating circuit 21" according to the first embodiment of the present invention. The third test pattern generating circuit 21" can be used as any of the test pattern generating circuits 21R, 21G, and 21B.

The structure of the third test pattern generating circuit 21" is largely different from the structures of the first test pattern generating circuit 21 and the second test pattern generating circuit 21' shown in corresponding FIGS. 3 and 4.

As shown in FIG. 6, the third test pattern generating circuit 21" includes a main scanning direction gradation pattern generating circuit 214, a sub scanning direction gradation pattern generating circuit 215, a fixed value pattern generating circuit 216, and a lattice pattern generating circuit 217 as pattern generating circuits. During the period of the test pattern signal TESTP_ST="L", test pattern data synchronized with the line synchronization signal XLSYNC of a main scanning direction gradation pattern, a sub scanning direction gradation pattern, a fixed value pattern, and a lattice pattern are generated and output.

The third test pattern generating circuit 21" further includes a selector (SEL) 218 which selects any one of the four patterns. The SEL 218 selects any one of the four patterns corresponding to a logical value of a selection signal P_SEL [1:0] in the following manner and inputs the selected pattern to the input terminal of the SEL 213.

When P_SEL [1:0]=00b, the main scanning direction gradation pattern is selected.
When P_SEL [1:0]=01b, the sub scanning direction gradation pattern is selected.
When P_SEL [1:0]=10b, the fixed value pattern is selected.
When P_SEL [1:0]=11b, the lattice pattern is selected.

Figure 7:
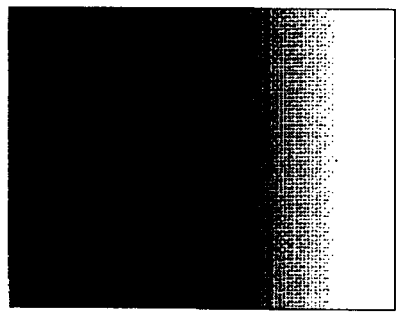
FIG. 7 is a diagram showing a main scanning direction gradation pattern generated by the third pattern generating circuit shown in FIG. 6.
Figure 8:
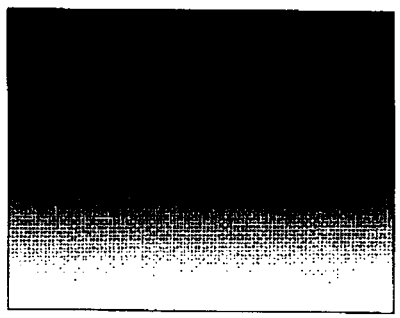
FIG. 8 is a diagram showing a sub scanning direction gradation pattern generated by the third pattern generating circuit shown in FIG. 6.
Figure 9:
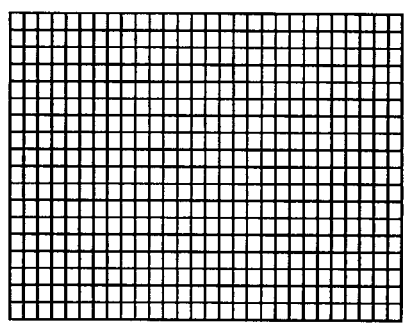
FIG. 9 is a diagram showing a lattice pattern generated by the third pattern generating circuit shown in FIG. 6.

FIG. 7 is a diagram showing a main scanning direction gradation pattern. FIG. 8 is a diagram showing a sub scanning direction gradation pattern. FIG. 9 is a diagram showing a lattice pattern.

The function of the SEL 213 shown in FIG. 6 is the same as that of the SEL 213 shown in FIGS. 3 and 4.

Figure 10:
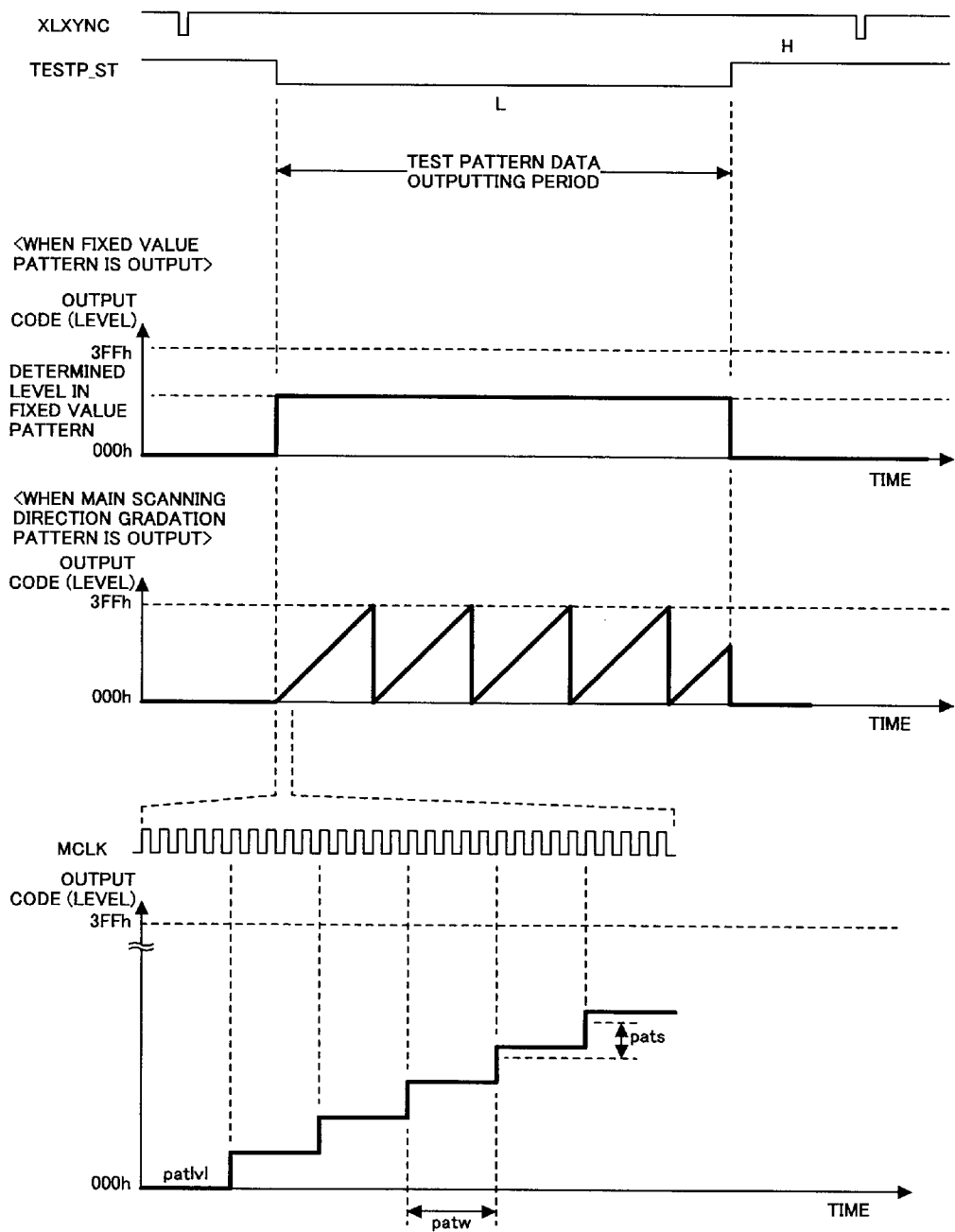
FIG. 10 is a timing chart when the main scanning direction gradation pattern and a fixed value pattern are output.

FIG. 10 is a timing chart when the main scanning direction gradation pattern and the fixed value pattern are output. The number of bits of an output image is 10, and MCLK is a clock synchronized with image data.

When the fixed value pattern is output, an output code (level) from 000h to 3FFh can be arbitrarily selected. During the test pattern data outputting period, a fixed value pattern with the selected level is output and a level (value) of 000h is output during the period other than the test pattern data outputting period.

When the main scanning direction gradation pattern is output, the following settings can be executed.

A start line level "pat|v|" is determined by setting a signal "pat|v|[9:0]" in a register.

The number of output pixels having the same level "patw" is determined by setting a signal "patw[7:0]" in a register.

A change level between gradations "pats" is determined by setting a signal "pats[7:0]" in a register.

The signal "pat|v|[9:0]", the signal "patw[7:0]", and the signal "pats[7:0]" are input to the main scanning direction gradation pattern generating circuit 214 shown in FIG. 6. However, the signals are not shown in FIG. 6.

The main scanning direction gradation pattern is output when P_SEL [1:0]=00b.

The above register is common in the main scanning direction gradation pattern and the sub scanning direction gradation pattern.

As shown in FIG. 10, the output of the main scanning direction gradation pattern starts at the set level of the signal "pat|v|[9:0]" in the register (at the "pat|v|"=00h in FIG. 10), and when the level exceeds 3FFh by being increased, the level returns to the set level. The same output code (level) is continued in the "patw". In FIG. 10, the "patw" is "5" (pixels). The "patw" is the number of pixels having the same level and is the number of counted clocks of MCLK. The output code (level) is increased by a register step unit of "pats".

When the lattice pattern is output, the following settings can be executed. However, the description is omitted in the drawing.

A main scanning direction lattice interval is determined by setting a signal "k_sp[9:0]" in a register.

A lattice line level is determined by setting a signal "k_|v|[9:0]" in a register.

A background level is determined by setting a signal "J_|v|[9:0]" in a register.

The signal "k_sp[9:0]", the signal "k_|v|[9:0]", and the signal "J_|v|[9:0]" are input to the lattice pattern generating circuit 217 shown in FIG. 6. However, the signals are not shown in FIG. 6.

Figure 11:
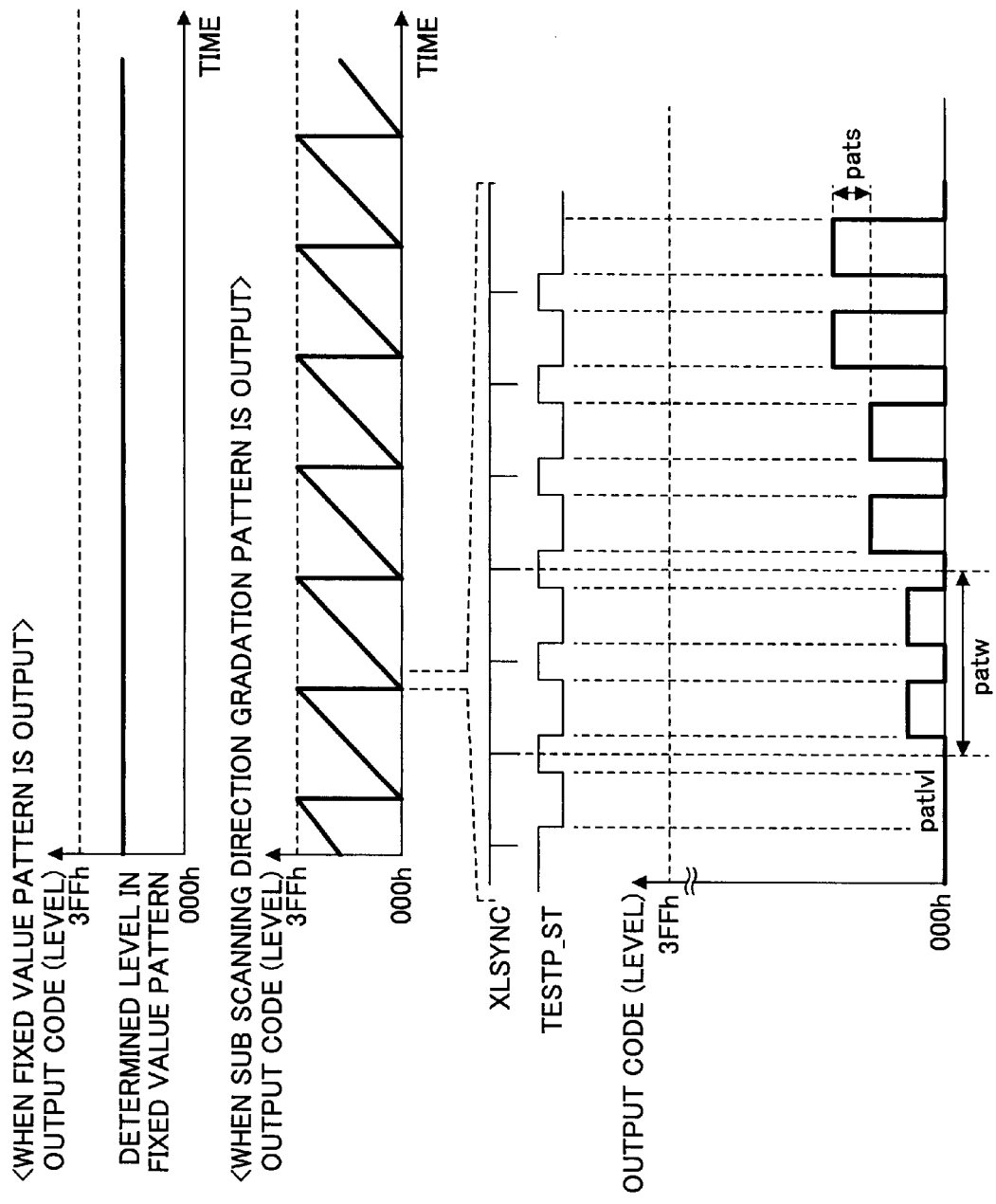
FIG. 11 is a timing chart when the sub scanning direction gradation pattern and the fixed value pattern are output.

FIG. 11 is a timing chart when the sub scanning direction gradation pattern and the fixed value pattern are output. The number of bits of an output image is 10, which is the same as that shown in FIG. 10.

When the fixed value pattern is output, an output level from 000h to 3FFh (output code) can be arbitrarily selected.

When the sub scanning direction gradation pattern is output, the following settings can be executed.

A start line level "patlvl" is determined by setting a signal "patlvl[9:0]" in a register.

The number of output lines having the same level "patw" is determined by setting a signal "patw[7:0]" in a register.

A change level between gradations "pats" is determined by setting a signal "pats[7:0]" in a register.

The signal "patlvl[9:0]", the signal "patw[7:0]", and the signal "pats[7:0]" are input to the sub scanning direction gradation pattern generating circuit 215 shown in FIG. 6. However, the signals are not shown in FIG. 6.

The sub scanning direction gradation pattern is output when P_SEL [1:0]=01b.

As described above, the above register is common in the main scanning direction gradation pattern and the sub scanning direction gradation pattern.

As shown in FIG. 11, the output of the sub scanning direction gradation pattern starts at the level of the "patlvl[9:0]" set in the register (at the "patlvl"=000h in FIG. 11), and when the level exceeds 3FFh by being increased, the level returns to the set level. The same output code (level) is continued in the "patw". In FIG. 11, the "patw" is "2" (lines). The "patw" is the number of the same level output lines and is the number of counted clocks of XLSYNC. The output code (level) is increased by a register step unit of "pats[7:0]".

When the lattice pattern is output, the following settings can be executed. However, the description is omitted in the drawing.

A sub scanning direction lattice interval is determined by setting a signal "sk_sp[9:0]" in a register.

As described above, when any one of the plural test patterns is selected, failure detecting accuracy and abnormal image analyzing accuracy can be increased in the image reading apparatus, and circuit inspection accuracy can be increased in the image reading signal processing IC 10.

When plural parameters are controlled in the plural test patterns, the failure detecting accuracy and the abnormal image analyzing accuracy can be further increased in the image reading apparatus, and the circuit inspection accuracy can be further increased in the image reading signal processing IC 10. For example, when an increment pattern of one LSB unit is confirmed by using the main scanning direction gradation pattern, a bit failure can be detected. In addition, an abnormal sub scanning direction control signal can be detected by using the main scanning direction gradation pattern. Further, an error of an LVDS output signal can be detected by the fixed value pattern.

[Second Embodiment]

Referring to FIGS. 12 through 15, an image reading signal processing IC according to a second embodiment of the present invention is described.

Figure 12:
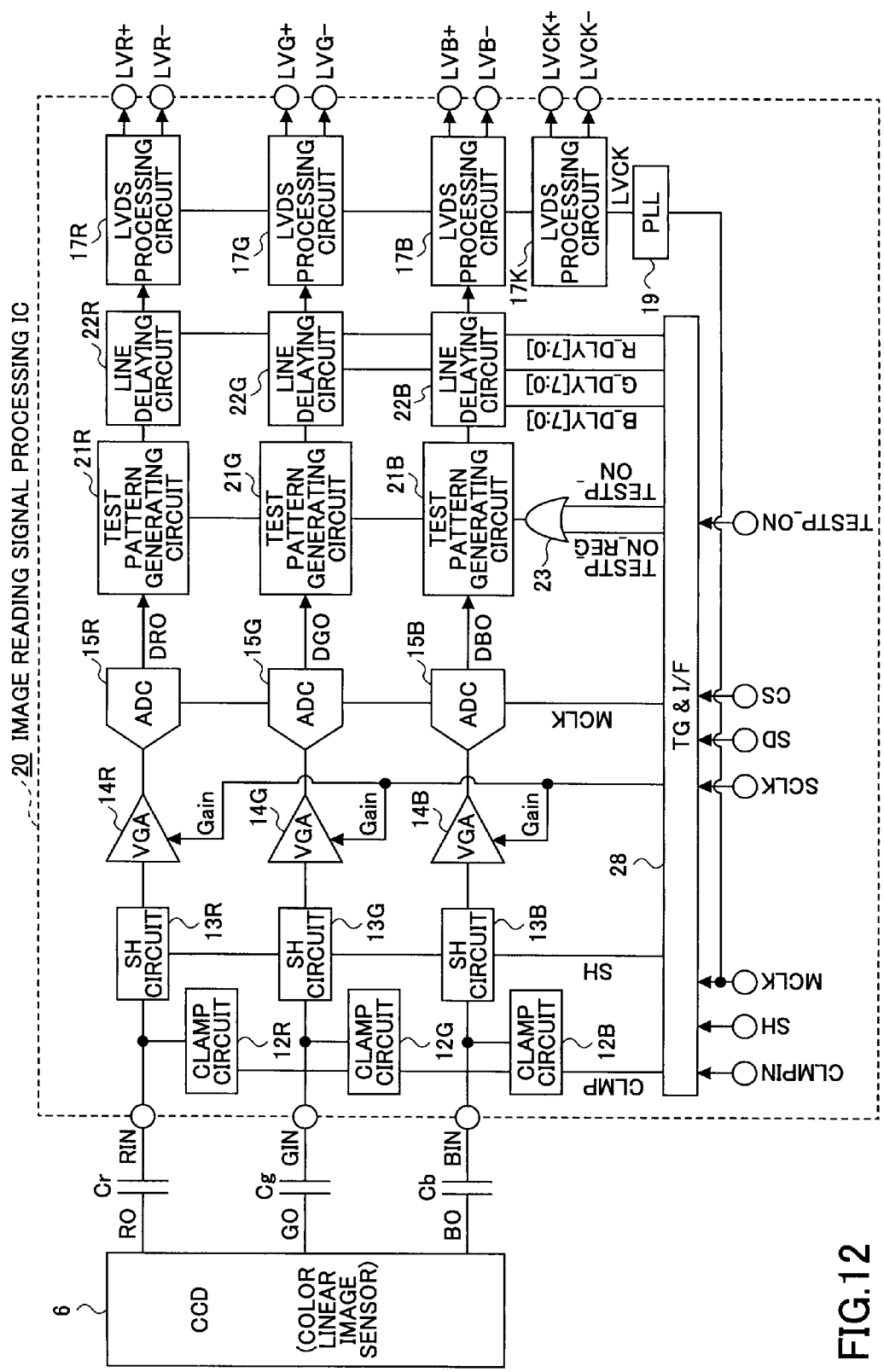
FIG. 12 is a block diagram showing an image reading signal processing IC according to a second embodiment of the present invention.

FIG. 12 is a block diagram showing an image reading signal processing IC 20 according to the second embodiment of the present invention. The image reading signal processing IC 20 shown in FIG. 12 includes common elements with the image reading signal processing IC 10 shown in FIG. 1; therefore, each of the common elements has the same reference number and the description of the common elements is omitted. In FIG. 12, in addition to the image reading signal processing IC 20, the CCD 6 and the capacitors Cr, Cg, and Cb are shown. The CCD 6 is used for an image reading apparatus and a color linear image sensor.

Figure 13:
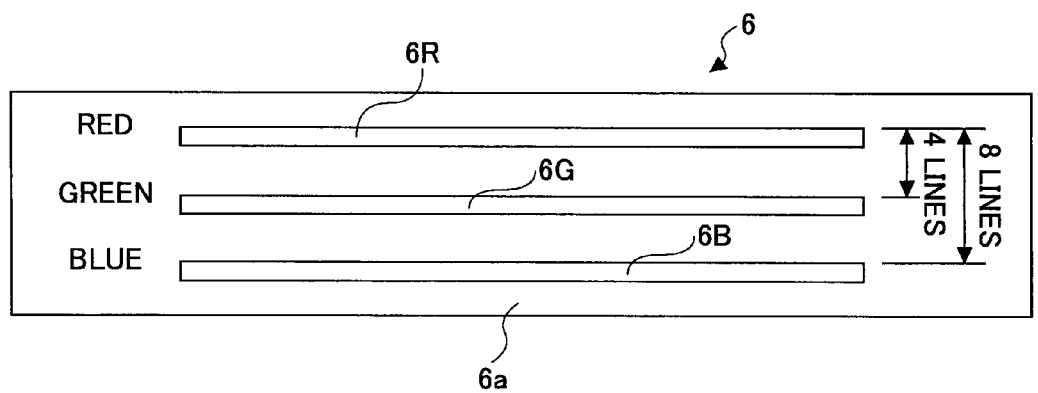
FIG. 13 is a diagram showing a light receiving surface of a CCD shown in FIG. 12.

FIG. 13 is a diagram showing a light receiving surface 6a of the CCD 6.

The light receiving surface 6a includes a light receiving section 6R for red (R) light, a light receiving section 6G for green (G) light, and a light receiving section 6B for blue (B) light. The interval between the light receiving sections 6R and 6G is 4 lines including one light receiving section and the interval between the light receiving sections 6G and 6B is 4 lines including one light receiving section. Since the light receiving sections 6R, 6G, and 6B are physically spaced apart from each other, the time is not the same when each of the light receiving sections 6R, 6G, and 6B reads the same position of a document. That is, the time of reading the same position of the document is shifted among the light receiving sections 6R, 6G, and 6B.

In order to write the R, G, and B image data at the same position when a color image is formed by correcting the time shift of the image data of R, G, and B, one color of image data is determined as the reference, and the other colors of image data must be delayed by corresponding predetermined lines.

It is different among the image reading apparatuses which color reading information is head information. For example, when the R image information is the head information and the B image data are the reference, in order to write the R, G, and B image data at the same position, the G image data must be delayed by four lines and the R image data must be delayed by eight lines.

The image reading signal processing IC 20 can execute delaying operations for the image data.

As shown in FIG. 12, when the image reading signal processing IC 20 is compared with the image reading signal processing IC 10, the image reading signal processing IC 20 additionally includes line delaying circuits 22R, 22G, and 22B. In addition, a TG & I/F 28 is used in the image reading signal processing IC 20 instead of using the TG & I/F 18. The line delaying circuits 22R, 22G, and 22B delay the corresponding predetermined number of lines of the corresponding image data, and are connected between the corresponding test pattern generating circuits 21R, 21G, and 21B, and the corresponding LVDS processing circuits 17R, 17G, and 17B. A control signal R_DLY[7:0] is input to the control terminal of the line delaying circuit 22R in which signal the number of delaying lines is determined, a control signal G_DLY[7:0] is input to the control terminal of the line delaying circuit 22G in which signal the number of delaying lines is determined, and a control signal B_DLY[7:0] is input to the control terminal of the line delaying circuit 22B in which signal the number of delaying lines is determined. The control signals R_DLY[7:0], G_DLY[7:0], and B_DLY[7:0] are output from the TG & I/F 28. The number of delaying lines is arbitrarily determined in each of the line delaying circuits 22R, 22G, and 22B.

When the CCD 6 shown in FIG. 13 is used, the R, G, and B image data can be written at the same position by the following settings.

R_DLY[7:0]=8
G_DLY[7:0]=4
B_DLY[7:0]=0

As the test pattern generating circuits 21R, 21G, and 21B in the second embodiment of the present invention, any one of the first test pattern generating circuit 21 shown in FIG. 3, the second test pattern generating circuit 21' shown in FIG. 4, and the third test pattern generating circuit 21" shown in FIG. 6 can be used. When the third test pattern generating circuit 21" shown in FIG. 6 is used for each of the test pattern generating circuits 21R, 21G, and 21B, any one of the four patterns can be selected for each color image data.

In addition, when the third test pattern generating circuit 21″ shown in FIG. 6 is used, only for one or more designated colors of image data, designated pattern data can be used, and for the other colors of image data, fixed value pattern data (full scale fixed value pattern data) can be used. In this case, since specific colors of image data can be easily confirmed by separating them from the other color of image data, the failure detecting accuracy and the abnormal image analyzing accuracy can be further increased in the image reading apparatus, and the circuit inspection accuracy can be further increased in the image reading signal processing IC 20.

Figure 14:
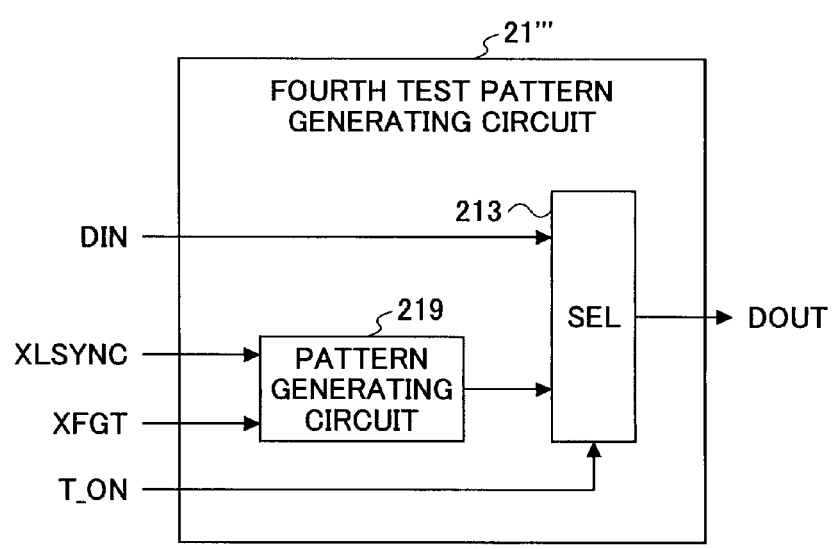
FIG. 14 is a block diagram showing a fourth test pattern generating circuit according to the second embodiment of the present invention.

FIG. 14 is a block diagram showing a fourth test pattern generating circuit 21‴ according to the second embodiment of the present invention. The fourth test pattern generating circuit 21‴ can be used in the first embodiment of the present invention.

As shown in FIG. 14, the fourth test pattern generating circuit 21‴ includes a pattern generating circuit 219 instead of using the pattern generating circuit 212 shown in FIG. 4, and a gate signal XFGT showing a sub scanning direction period is input to the pattern generating circuit 219 instead of inputting the test pattern signal TESTP_ST. The gate signal XFGT can be input from an external device. In the second embodiment of the present invention, as the test pattern generating circuits 21R, 21G, and 21B shown in FIG. 12, the fourth test pattern generating circuit 21‴ can be used.

Figure 15:
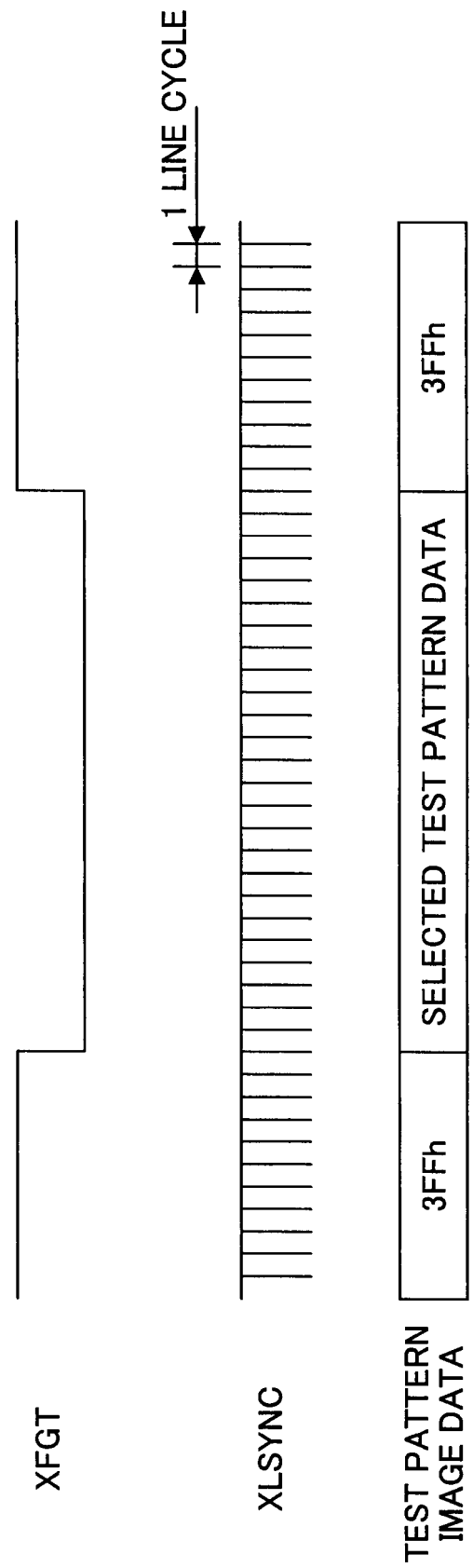
FIG. 15 is a timing chart showing operations of the fourth test pattern generating circuit shown in FIG. 14.

FIG. 15 is a timing chart showing operations of the fourth test pattern generating circuit 21‴. As shown in FIG. 15, the fourth test pattern generating circuit 21‴ outputs image data of a test pattern selected during the period of the gate signal XFGT="L". Fixed value level image data (full scale fixed value pattern data) are output during the period of the gate signal XFGT "H". In FIG. 15, the fixed value level image data are shown as 3FFh.

When the fourth test pattern generating circuit 21‴ is used, the output image data of the test pattern can be switched between the image data of the selected test pattern and the full scale fixed value level image data (image data of the full scale fixed value pattern).

[Third Embodiment]

Figure 16:
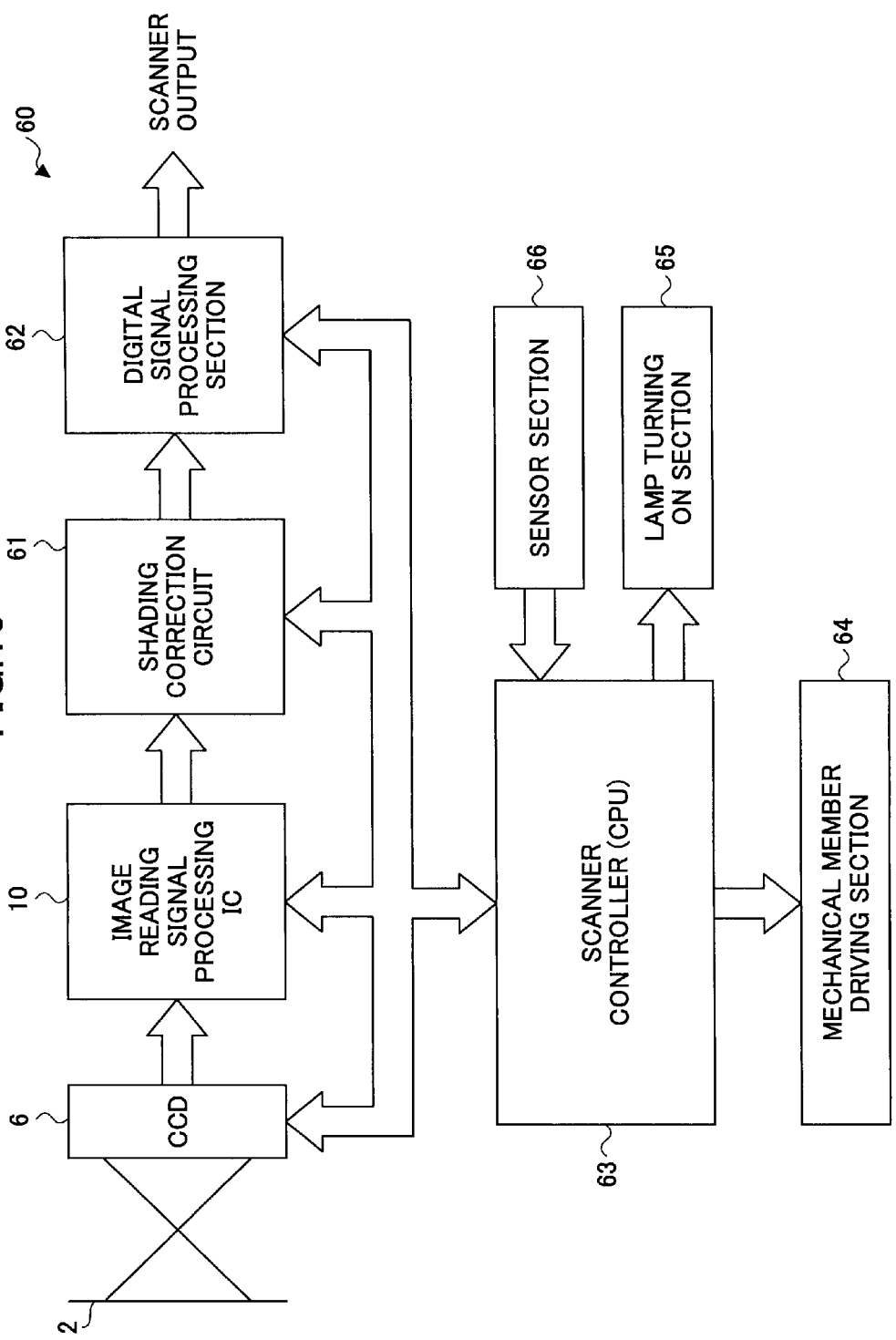
FIG. 16 is a block diagram showing an image reading apparatus according to a third embodiment of the present invention.

Referring to FIG. 16, a third embodiment of the present invention is described. FIG. 16 is a block diagram showing an image reading apparatus 60 according to the third embodiment of the present invention. In the image reading apparatus 60 shown in FIG. 16, when the CCD 6 converts color image information of the document 2 into electric signals corresponding to three primary colors, the scanning optical system shown in FIG. 2 is used. As an image reading signal processing IC which processes three-color image signals read by the CCD 6, the image reading signal processing IC 10 shown in FIG. 1 is used; however, the image reading signal processing IC 20 shown in FIG. 12 can be used.

As an image signal system, as shown in FIG. 16, the image reading apparatus 60 includes a shading correction circuit 61 and a digital signal processing section 62 behind (downstream of) the image reading signal processing IC 10. In order to correct dispersion of a light amount distribution of the light source 7 and dispersion of sensitivity of pixels in the CCD 6, the shading correction circuit 61 stores data read from the reference white plate 8 in a memory as shading correction data. When the document 2 is read, the shading correction circuit 61 executes the shading correction by reading the shading correction data from the memory.

The digital signal processing section 62 applies image processes such as a variable power process, a γ conversion process, and a color conversion process to image data output from the shading correction circuit 61 and outputs the processed image data to external devices such as a personal computer (not shown) and a printer (not shown) as scanner output.

As shown in FIG. 16, the image reading apparatus 60 further includes a scanner controller 63, a mechanical member driving section 64, a lamp turning on section 65, and a sensor section 66. The scanner controller 63 includes a CPU and controls the image signal system, and operations and timing of the operations of the sections 64, 65, and 66. The mechanical member driving section 64 drives mechanical members such as the first moving member 3, the second moving member 4 shown in FIG. 2, and a cooling fan (not shown). The lamp turning on section 65 turns on the light source 7 shown in FIG. 2 and other lamps (not shown) in the image reading apparatus 60. The sensor section 66 includes sensors for detecting the home position of the first and second moving members 3 and 4, the temperature of the light source 7, and so on.

Since the structure and the functions of the image reading apparatus 60 are the same as those of an existing image reading apparatus other than the function of the image reading signal processing IC 10 (20), the detailed description of the image reading apparatus 60 is omitted.

The image reading apparatus 60 includes the image reading signal processing IC 10 (20) and the image reading signal processing IC 10 (20) includes the test pattern generating circuits 21R, 21G, and 21B. Since the image reading apparatus 60 does not need to include an additional test pattern generating circuit, the cost of the image reading apparatus 60 can be decreased and the area for mounting the additional test pattern generating circuit is not needed. In addition, any one or more test patterns can be selected, so that the image reading apparatus 60 can increase inspection accuracy such as the failure detecting accuracy and the abnormal image analyzing accuracy.

[Fourth Embodiment]

Figure 17:
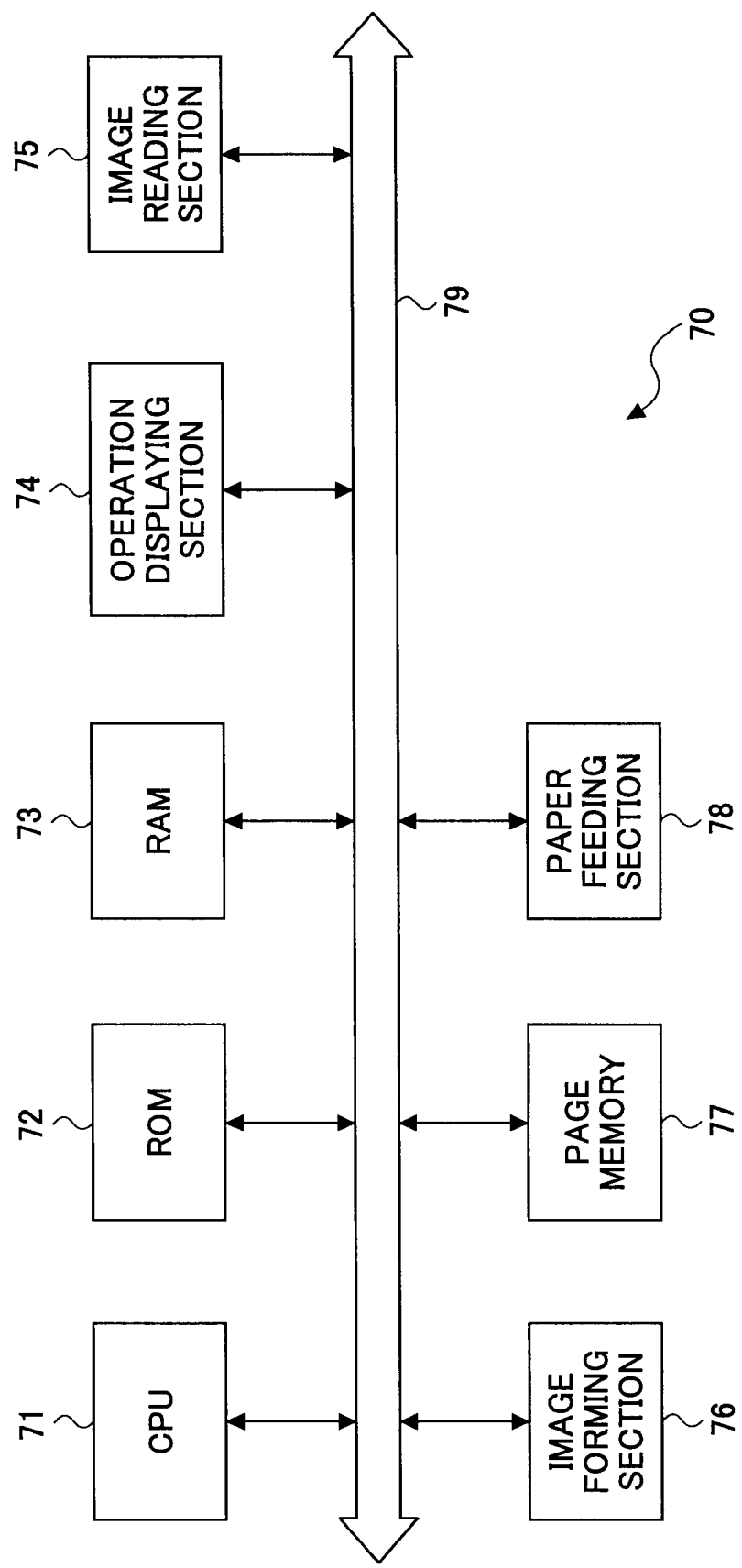
FIG. 17 is a block diagram showing an image forming apparatus according to a fourth embodiment of the present invention.

Next, referring to FIG. 17, an image forming apparatus according to a fourth embodiment of the present invention is described.

FIG. 17 is a block diagram showing an image forming apparatus 70 according to the fourth embodiment of the present invention.

The image forming apparatus includes a CPU 71, a ROM 72, a RAM 73, an operation displaying section 74, an image reading section 75, an image forming section 76, a page memory 77, a paper feeding section 78, and a bus 79. The bus 79 connects the above elements. The CPU 71 controls operations of the image forming apparatus 70. The ROM 72 stores programs which the CPU 71 executes. The RAM 73 stores data for operating the image forming apparatus 70 and is a working memory for the CPU 71. The CPU 71, the ROM 72, and the RAM 73 form a microcomputer connected via the bus 79.

The operation displaying section 74 includes a display such as an LCD (liquid crystal display) for displaying information such as operating conditions of the image forming apparatus 70, and a keyboard (including a touch panel) by which a user inputs instructions to the image forming apparatus 70.

The image reading section 75 corresponds to the image reading apparatus 60 shown in FIG. 16. That is, the image reading section 75 includes the image reading signal processing IC 10 or 20. The image reading section 75 optically reads a color image and outputs digital image data corresponding to three primary colors, and stores the digital image data of each color page in the page memory 77 page by page under the control of the CPU 71.

The image forming section 76 is a plotter such as a laser printer and an inkjet printer which forms a color image on a recording medium (paper) by processing the digital image data. The paper feeding section 78 feeds the recording medium (paper) to the image forming section 76 and includes a paper feeding mechanism such as a paper feeding tray and a paper feeding roller.

As described above, the image forming apparatus 70 includes the image reading section 75 having the image reading signal processing IC 10 or 20. Therefore, the image forming apparatus 70 does not need to include an additional test pattern generating circuit, the cost of the image forming apparatus 70 can be decreased and the area for mounting the additional test pattern generating circuit is not needed. In addition, any one or more plural test patterns can be selected, so that the image reading section 75 in the image forming apparatus 70 can increase inspection accuracy such as the failure detecting accuracy and the abnormal image analyzing accuracy.

The image forming apparatus 70 can be a digital copying apparatus, a facsimile apparatus, and a multifunctional apparatus including a copying function, a facsimile function, a printing function, and so on.

As described above, according to the embodiments of the present invention, the image reading signal processing IC 10 or 20 can be applied to a color image reading apparatus such as an image scanner which reads color image information of a document. In addition, the color image reading apparatus can be applied to a digital copying apparatus, a facsimile apparatus, and a multifunctional apparatus including a copying function, a facsimile function, a printing function, and so on.

Further, the present invention is not limited to the specifically disclosed embodiments, and variations and modifications may be made without departing from the scope of the present invention.

The present invention is based on Japanese Priority Patent Application No. 2006-207274, filed on Jul. 29, 2006, with the Japanese Patent Office, the entire contents of which are hereby incorporated herein by reference.

What is claimed is:

1. An image reading apparatus, comprising:
   a color linear image sensor which optically reads color image information of a document, converts the read color image information into electric signals corresponding to three primary colors, and outputs the electric signals as analog image signals; and
   an image reading signal processing IC to which the analog image signals are input; wherein
   the image reading signal processing IC includes three circuits which independently process the input analog image signals of the corresponding three primary colors;
   each of the three circuits includes
      a sample-hold circuit which samples the analog image signals and holds the values of the sampled analog image signals;
      a VGA which amplifies the analog image signals held by and output from the sample-hold circuit;
      an ADC which converts the amplified analog image signals into digital image data;
      an LVDS processing circuit which outputs the digital image data in a low voltage differential signaling level;
      a test pattern generating circuit connected between the ADC and the LVDS processing circuit for generating digital data of a test pattern; and
      a line delaying circuit which cancels differences in positions of light receiving sections of respective colors of the color linear image sensor by delaying a start line of the digital data of the test pattern generated by the test pattern generating circuit by a predetermined number of lines, according to a control signal that is input separately for the corresponding color of the three primary colors,
   the image reading signal processing IC further includes
      an operational mode determination information input unit which inputs operational mode determination information to the test pattern generating circuit;
      a switching unit which switches one of the digital data of the test patterns to any one or more of main scanning direction gradation pattern data and sub scanning direction gradation pattern data; and
      a designation unit that designates the following parameters when the test pattern generating circuit generates the digital data of the test pattern,
      the parameters are
         a first line start level, a number of output pixels having a same level, a change level between gradations for the main scanning direction gradation pattern data, and
         a first line start level, a number of output lines having a same level, a change level between gradations for the sub scanning direction gradation pattern data, and
      an operational mode of each of the test pattern generating circuits is switched between a normal mode which outputs digital image data output from the ADC and a test pattern output mode which outputs the digital data of the test pattern generated by the test pattern generating circuit corresponding to the operational mode determination information input from the operational mode determination information input unit.

2. The image reading apparatus as claimed in claim 1, wherein:
   the digital data of the test pattern are generated by the test pattern generating circuit based on image data read from the document, and the digital data of the test pattern are output in a designated period of one line cycle and predetermined digital data are output in a period other than the designated period.

3. The image reading apparatus as claimed in claim 1, wherein:
   the digital data of the test pattern generated by the test pattern generating circuit include any one or more of the main scanning direction gradation pattern data, the sub scanning direction gradation pattern data, full scale fixed value pattern data, and lattice pattern data.

4. The image reading apparatus as claimed in claim 3, wherein:
   the designation unit designates one or more of the following parameters when the test pattern generating circuit generates the digital data of the test pattern; and
   the parameters are
      fixed value data for the full scale fixed value pattern data; and
      a main scanning direction lattice interval, a sub scanning direction lattice interval, a lattice line level, and a background level.

5. The image reading apparatus as claimed in claim 1, wherein:
only one test pattern generating circuit corresponding to a designated color in the three circuits outputs the digital data of the test pattern, and the other test pattern generating circuits output a full scale fixed value pattern data.

6. The image reading apparatus as claimed in claim 1, wherein the switching unit switches one of the digital data of the test patterns to an other digital data of the test patterns by a signal from an external device.

7. An image forming apparatus, comprising:
an image reading apparatus including a color linear image sensor which optically reads color image information of a document, converts the read color image information into electric signals corresponding to three primary colors, and outputs the electric signals as analog image signals;
an image reading signal processing IC to which the analog image signals are input and from which digital image data are output; and
an image forming section which prints the digital image data output from the image reading apparatus on a recording medium; wherein
the image reading signal processing IC includes three circuits which independently process the input analog image signals of the corresponding three primary colors;
each of the three circuits includes
a sample-hold circuit which samples the analog image signals and holds values of the sampled analog image signals;
a VGA which amplifies the analog image signals held by and output from the sample-hold circuit;
an ADC which converts the amplified analog image signals into digital image data;
an LVDS processing circuit which outputs the digital image data of the ADC in a low voltage differential signaling level;
a test pattern generating circuit connected between the ADC and the LVDS processing circuit for generating digital data of a test pattern; and
a line delaying circuit which cancels differences in positions of light receiving sections of respective colors of the color linear image sensor by delaying a start line of the digital data of the test pattern generated by the test pattern generating circuit by a predetermined number of lines, according to a control signal that is input separately for the corresponding color of the three primary colors,
the image reading signal processing IC further includes
an operational mode determination information input unit which inputs operational mode determination information to the test pattern generating circuit,
a switching unit which switches one of the digital data of the test patterns to any one or more of main scanning direction gradation pattern data and sub scanning direction gradation pattern data, and
a designation unit that designates the following parameters when the test pattern generating circuit generates the digital data of the test pattern,
the parameters are
a first line start level, a number of output pixels having a same level, a change level between gradations for the main scanning direction gradation pattern data, and
a first line start level, a number of output lines having a same level, a change level between gradations for the sub scanning direction gradation pattern data, and
an operational mode of each of the test pattern generating circuits is switched between a normal mode which outputs digital image data output from the ADC and a test pattern output mode which outputs the digital data of the test pattern generated by the test pattern generating circuit corresponding to the operational mode determination information input from the operational mode determination information input unit.

8. The image forming apparatus as claimed in claim 7, wherein:
the digital data of the test pattern are generated by the test pattern generating circuit based on image data read from the document, and the digital data of the test pattern are output in a designated period of one line cycle and predetermined digital data are output in a period other than the designated period.

9. The image forming apparatus as claimed in claim 7, wherein:
the digital data of the test pattern generated by the test pattern generating circuit include any one or more of the main scanning direction gradation pattern data, the sub scanning direction gradation pattern data, full scale fixed value pattern data, and lattice pattern data.

10. The image forming apparatus as claimed in claim 9, wherein:
the designation unit designates one or more of the following parameters when the test pattern generating circuit generates the digital data of the test pattern; and
the parameters are
fixed value data for the full scale fixed value pattern data; and
a main scanning direction lattice interval, a sub scanning direction lattice interval, a lattice line level, and a background level.

11. The image forming apparatus as claimed in claim 7, wherein:
only one test pattern generating circuit corresponding to a designated color in the three circuits outputs the digital data of the test pattern, and the other test pattern generating circuits output a full scale fixed value pattern data; and
the switching unit switches one of the digital data of the test patterns to an other digital data of the test patterns by a signal from an external device.

* * * * *